US012798343B2

(12) United States Patent
Kolvenbach et al.

(10) Patent No.: US 12,798,343 B2
(45) Date of Patent: Nov. 17, 2026

(54) BODY FOR A MOTOR VEHICLE AND MOTOR VEHICLE

(71) Applicant: FORD GLOBAL TECHNOLOGIES, LLC, Dearborn, MI (US)

(72) Inventors: Daniel Kolvenbach, Cologne (DE); Tobias Duffe, Cologne (DE); Fabian Pritz, Leverkusen (DE); Thomas Benderoth, Gummersbach (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 277 days.

(21) Appl. No.: 18/640,387

(22) Filed: Apr. 19, 2024

(65) Prior Publication Data

US 2024/0351409 A1 Oct. 24, 2024

(30) Foreign Application Priority Data

Apr. 21, 2023 (DE) ......................... 102023110146.3

(51) Int. Cl.
*B60J 7/11* (2006.01)
*B60J 7/19* (2006.01)
*B60J 10/90* (2016.01)

(52) U.S. Cl.
CPC ................. *B60J 7/11* (2013.01); *B60J 7/194* (2013.01); *B60J 10/90* (2016.02)

(58) Field of Classification Search
CPC ....... B60J 7/11; B60J 7/19; B60J 7/194; B60J 10/90; B60R 9/045; B60R 9/052
See application file for complete search history.

(56) References Cited

U.S. PATENT DOCUMENTS 4,358,153 A * 11/1982 Iwata .......................... B60J 7/11 296/213
4,541,665 A * 9/1985 Draper ................... B60J 7/1642 296/218

(Continued)

FOREIGN PATENT DOCUMENTS

DE 19729044 A1 1/1999
DE 102008046496 A1 4/2009

(Continued)

OTHER PUBLICATIONS

German Search Report for German Application No. DE 10 2023 110 146.3, Completed by the German Patent Office, Dated Apr. 23, 2024, 8 pages.

*Primary Examiner* — Gregory A Blankenship
(74) *Attorney, Agent, or Firm* — Todd Dishman; Brooks Kushman P.C.

(57) ABSTRACT

A body for a motor vehicle facilitates replacement of a vehicle roof by another roof of the same type or a different type. The body defines a roof opening having a roof frame arranged around the roof opening with a reinforcing profile around the periphery of the opening. A roof seal is supported by the reinforcing profile and has a highest point higher than immediately adjacent regions of the roof frame on the side of the roof seal facing away from the roof opening. The body has a closed state with the roof releasably fastened to the roof frame in contact with the roof seal over the entire periphery from above and an open state in which the roof is no longer fastened to the roof frame and is displaced from the closed state upwardly and away from the roof seal for replacement of the roof with another.

18 Claims, 7 Drawing Sheets

(56) References Cited

U.S. PATENT DOCUMENTS

| | | | | |
|---|---|---|---|---|
| 6,039,391 | A * | 3/2000 | Takahashi | B60J 7/11 296/218 |
| 9,180,762 | B2 | 11/2015 | Jeakle et al. | |
| 2005/0029839 | A1* | 2/2005 | Stemmer | B62D 25/06 296/215 |
| 2007/0024092 | A1* | 2/2007 | Zirbs | B62D 25/06 296/214 |
| 2010/0007179 | A1* | 1/2010 | Fallis, III | B60J 7/11 296/218 |
| 2016/0046241 | A1* | 2/2016 | Crismon | B60J 7/102 224/326 |
| 2019/0270413 | A1* | 9/2019 | Dellock | B60R 9/04 |
| 2019/0283808 | A1* | 9/2019 | Kreuzer | B62D 27/023 |
| 2019/0299871 | A1* | 10/2019 | Marchlewski | E05B 79/04 |
| 2021/0170848 | A1* | 6/2021 | Willard | B60J 7/194 |
| 2023/0112227 | A1* | 4/2023 | Telukunta | B60R 9/045 224/314 |
| 2024/0116450 | A1* | 4/2024 | Sirrenberg | B60R 9/04 |
| 2024/0149649 | A1* | 5/2024 | Choi | B60J 7/11 |
| 2024/0351409 | A1* | 10/2024 | Kolvenbach | B60J 7/194 |
| 2025/0249836 | A1* | 8/2025 | Benderoth | B60R 9/058 |

FOREIGN PATENT DOCUMENTS

| | | | |
|---|---|---|---|
| EP | 1669245 | A1 | 6/2006 |
| EP | 1721769 | A1 | 11/2006 |
| WO | 2021142414 | A1 | 7/2021 |

* cited by examiner

BODY FOR A MOTOR VEHICLE AND MOTOR VEHICLE

CROSS-REFERENCE TO RELATED APPLICATIONS

This application claims foreign priority benefits under 35 U.S.C. § 119 (a)-(d) to DE Application 10 2023 110 146.3 filed Apr. 21, 2023, which is hereby incorporated by reference in its entirety.

TECHNICAL FIELD

This disclosure is related to a motor vehicle body that facilitates a removable roof module and sealing strategy.

BACKGROUND

Various types of roof are available for a motor vehicle, such as for example a steel roof which has no parts which are movable relative to one another and thus cannot be opened in a non-destructive manner or a sliding roof which can be opened and closed again by displacing a cover. Conventionally the steel roof is welded to the remaining body, whereas the sliding roof is fastened to the remaining body by a combination of adhesive bonding and threaded fastening. These are complex operating steps, both in the case of welding and also in the combination of adhesive bonding and threaded fastening. Replacing the roof would result in a welded connection or an adhesively bonded connection being destroyed and having to be produced again, which is costly. Moreover, it is not possible to replace a steel roof for a sliding roof. Thus, it is necessary to select the type of roof during the purchase of a motor vehicle. It would thus be desirable to provide a body in which the roof could be replaced in a simple manner.

SUMMARY

As described in detail herein, embodiments according to the disclosure provide a body for a motor vehicle and a motor vehicle comprising the body in which a roof of the body can be replaced in a simplified manner.

According to one or more embodiments, the body for a motor vehicle defines a roof opening over the entire periphery. The body has a roof frame, a reinforcing profile sheet, a roof seal and a roof. The roof frame is arranged around the roof opening. The reinforcing profile of the reinforcing profile sheet is arranged around the entire periphery of the roof opening. The sheet is supported by the roof frame and is fixedly attached to the roof frame. The roof seal is supported by the reinforcing profile sheet and the highest point of the roof seal is higher than those regions of the roof frame which are arranged immediately adjacent to the roof seal and on the side of the roof seal facing away from the roof opening. The body has a closed state in which the roof is releasably fastened to the roof frame and is in contact with the roof seal over the entire periphery from above and thus closes the roof opening, and an open state in which the roof is no longer fastened to the roof frame and is displaced from the closed state upwardly and away from the roof seal.

After the body has been reconfigured from the closed state into the open state, and in particular the roof has been removed, the roof can be replaced by another roof. The replacement roof can be a different type from that of the originally equipped roof. As the body is reconfigured from the closed state into the open state by the roof being displaced away from the roof seal, the roof seal can stay on the remaining body and seal the replacement roof in the same manner as the originally equipped roof. The roof seal is configured such that removal of the equipped roof does not require or otherwise result in destruction of the roof seal when the body is reconfigured from the closed state into the open state. The roof can therefore be replaced in a simplified manner, since the roof seal is not destroyed and the roof is releasably fastened to the roof frame in the closed state.

Since the highest point of the roof seal is higher than those regions of the roof frame which are arranged immediately adjacent to the roof seal and on the side of the roof seal facing away from the roof opening, water above the roof frame is advantageously prevented from passing through the roof seal in the direction of the roof opening.

A planar surface of the sheet receives and supports the roof seal is provided with a reinforcing profile to provide a predetermined desired degree of stiffness.

In various embodiments, the roof seal is fastened to the reinforcing profile. As a result, it is ensured that the roof seal remains on the reinforcing profile when the body is reconfigured from the closed state into the open state. In at least one embodiment, the roof seal is adhesively bonded only to the reinforcing profile. In at least one embodiment, the roof seal is adhesively bonded only to the reinforcing profile around the entire periphery of the roof opening with little or no adhesive contacting the roof to facilitate removal of the roof without damaging the roof seal.

The body may have a frame seal which is arranged around the entire periphery of the roof opening that seals the region between the frame and the reinforcing profile. It is possible to compensate for unevenness in the roof frame by means of the frame seal. The frame seal may comprise an adhesive, the reinforcing profile being fastened thereby to the roof frame. In particular, the frame seal can also consist of the adhesive.

In one or more embodiments, the body has a plurality of threaded fasteners, the roof being releasably fastened thereby to the roof frame in the closed state, wherein in each case a through-hole is provided for each of the threaded fasteners in the roof frame, in each case one of the threaded fasteners extending through said through-hole in the closed state. The roof can be fastened in a particularly simple manner to the roof frame and released from the roof frame by the provision of the threaded fasteners.

The body may include a first rail, wherein the first rail is arranged above the roof in the closed state, wherein a first set of threaded fasteners is countersunk in the first rail and pushes the first rail downwardly. The body may have for each of the threaded fasteners of the first set in each case a threaded receiver which is arranged below the roof frame and which has an internal thread in which one of the threaded fasteners of the first set engages in the closed state. The threaded receiver may be a threaded hole in the roof frame or may be a threaded part fastened to the roof frame. The body may also include a second rail, wherein the second rail is arranged above the roof in the closed state, wherein a second set of threaded fasteners is countersunk in the second rail and pushes the second rail downwardly. The body may have for each of the threaded fasteners of the second set in each case a threaded part which is arranged below the roof frame and which has an internal thread in which one of the threaded fasteners of the second set engages in the closed state. The threaded part is fastened, in particular, to the roof frame. The threaded fasteners are advantageously not visible due to the provision of the first rail and optionally the second rail. Additionally, the pressure applied by the threaded fasteners from above onto the roof can be particularly uniformly distributed due to the provision of the first rail and optionally the second rail.

A third set of threaded fasteners may be provided, wherein a threaded part, which is fastened to the roof, is provided in each case for each threaded fastener of the third set. The third set of threaded fasteners can be divided into a front set which is arranged in the direction of travel of the roof opening and a rear set which is arranged counter to the direction of travel of the roof opening.

In one or more embodiments the roof seal is a cavity seal. Alternatively, the roof seal is formed by a foam, wherein the foam is designed to be deformed when the roof is fastened to the roof frame.

The roof may have on its lower face an indentation in which the roof seal is arranged in the closed state. In particular, the indentation is configured over the entire periphery. Similarly, the other (replacement) roof also has on its lower face a further indentation which is configured, in particular, in the same shape as the indentation. As a result, the indentation and/or the other indentation form an interface with the reinforcing profile and the roof seal.

In various embodiments the roof is one of a roof without parts which are movable relative to one another, a sliding roof, a panoramic roof, a tilting roof, a spoiler roof, or a retractable roof. The other (replacement) roof can be, for example, a roof without parts which are movable relative to one another, a sliding roof, a panoramic roof, a tilting roof, a spoiler roof or a retractable roof.

The motor vehicle according to the disclosure comprises the body.

The embodiments of the invention are explained in more detail hereinafter with reference to the accompanying schematic drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
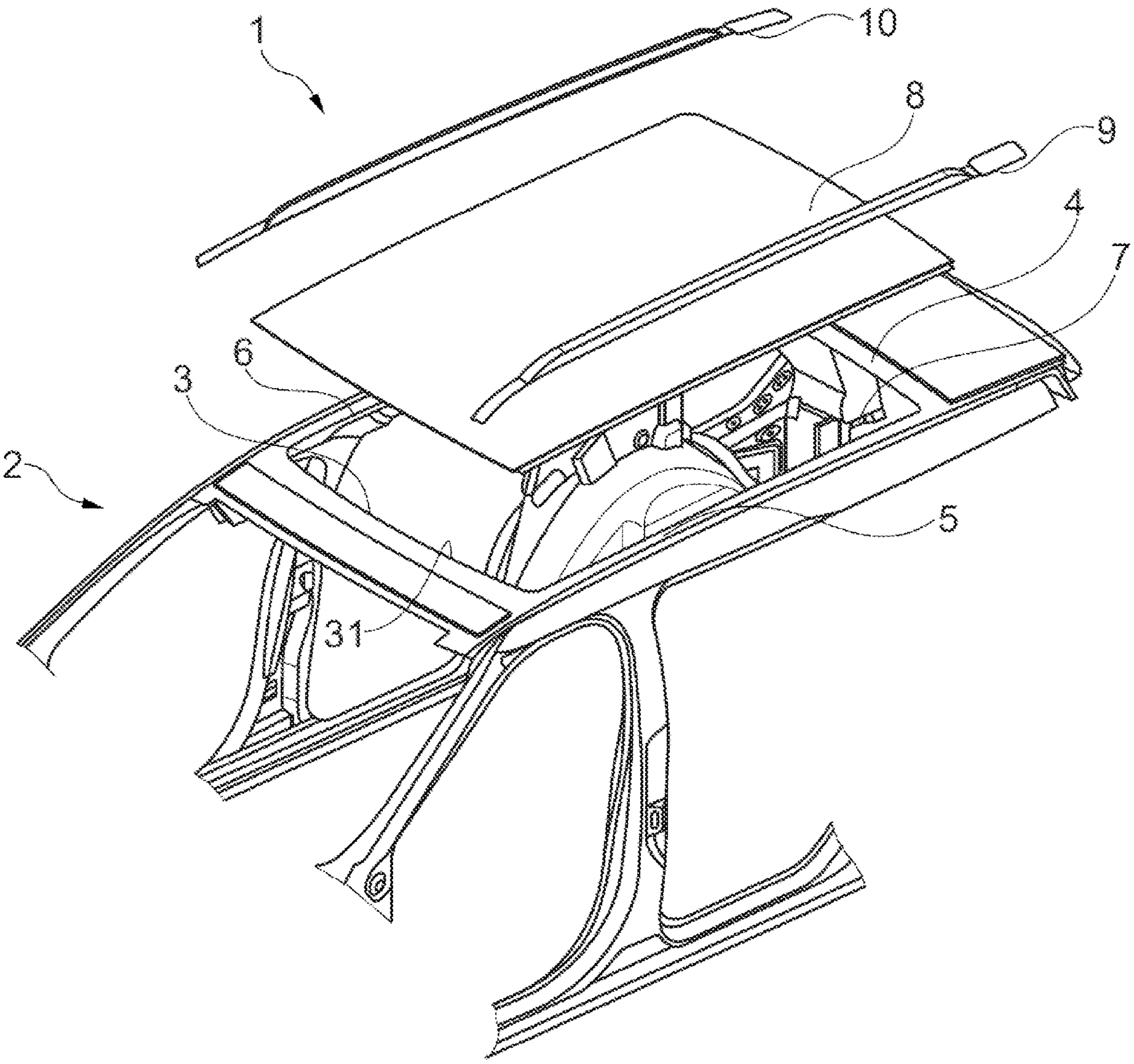
FIG. 1 shows a perspective view of a body in an open state of the body.
Figure 2:
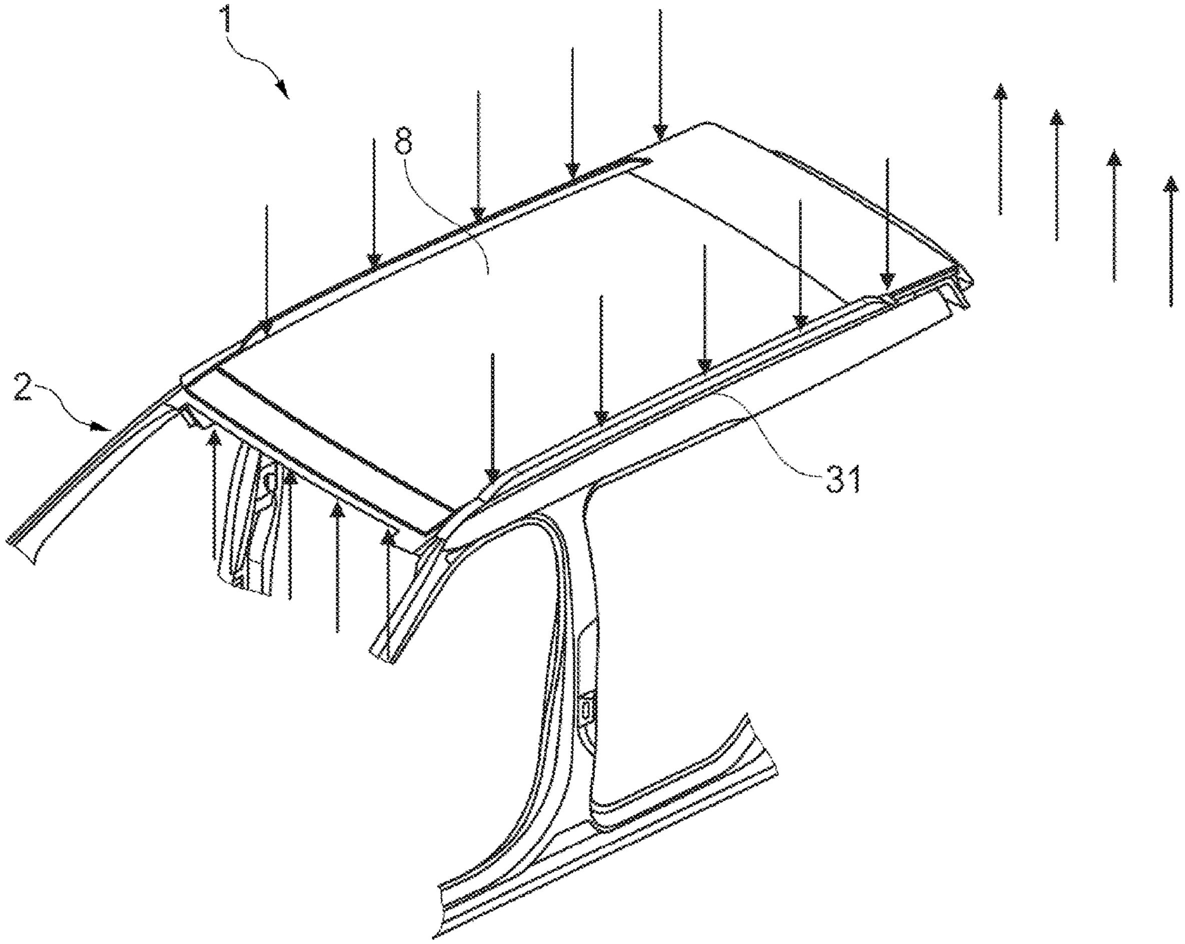
FIG. 2 shows the view of FIG. 1 in a closed state of the body.
Figure 3:
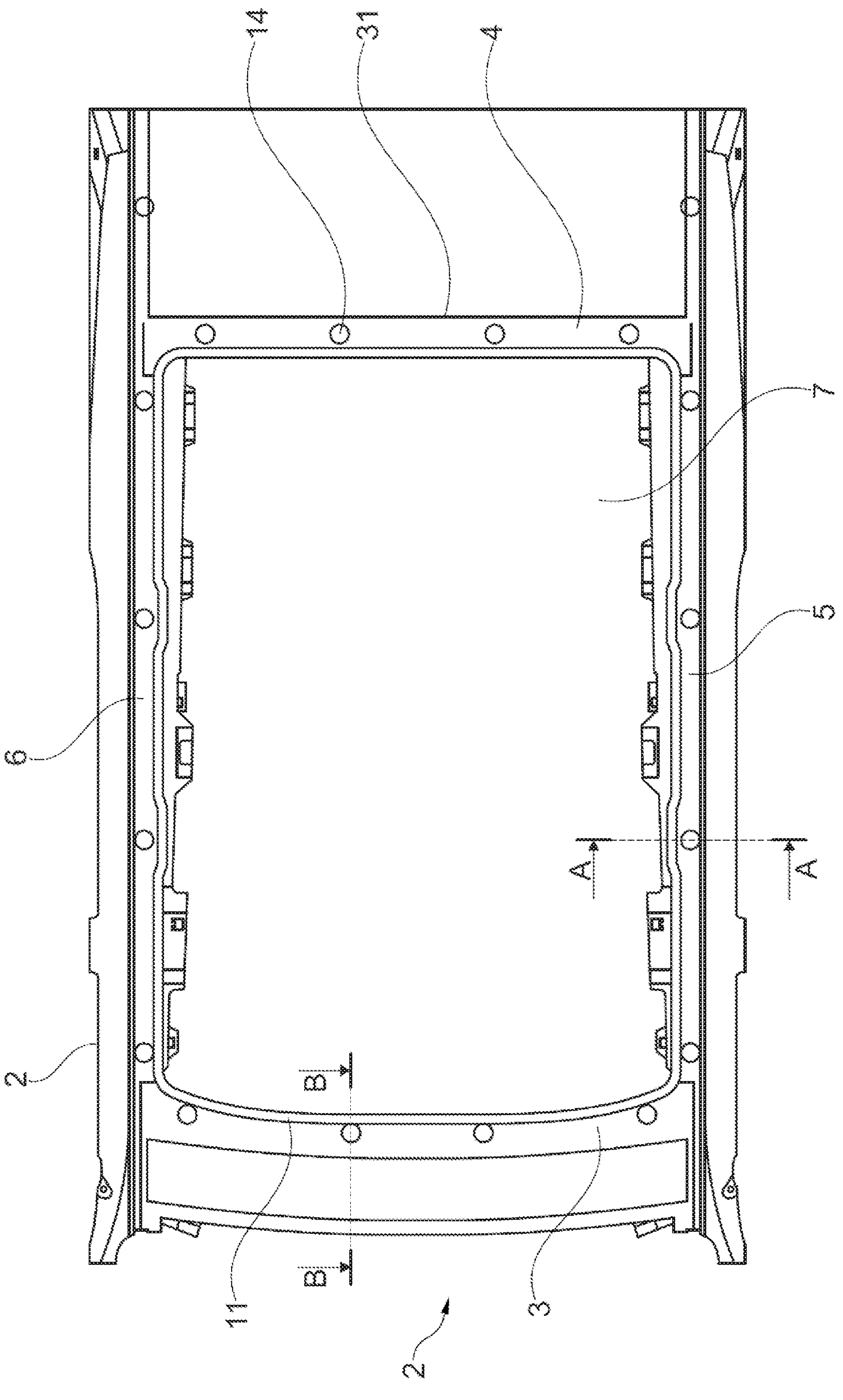
FIG. 3 shows a view from above of a part of the body.

As can be seen in FIGS. 1 to 7, a body 2 for a motor vehicle 1 defines a roof opening 7 over the entire periphery. The body 2 has a roof frame 31, a reinforcing profile 12, a roof seal 13 and a roof 8. The roof frame 31 is arranged around the roof opening 7. The reinforcing profile 12 is arranged around the entire periphery of the roof opening 7, is supported by the roof frame 31 and is fixedly attached to the roof frame 31. The roof seal 13 is supported by the reinforcing profile 12 and the highest point of the roof seal 13 is higher than those regions of the roof frame 31 which are arranged immediately adjacent to the roof seal 13 and on the side of the roof seal 13 facing away from the roof opening 7. The body 2 has a closed state in which the roof 8 is releasably fastened to the roof frame 31 and is in contact with the roof seal 13 from above over the entire periphery and thus closes the roof opening 7, and an open state in which the roof 8 is no longer fastened to the roof frame 31 and is displaced from the closed state upwardly and away from the roof seal 13. The closed state is shown in FIG. 2 and the open state is shown in FIG. 1.

It is conceivable that in the open state an interior of the motor vehicle 1 is accessible from above via the roof opening 7, see FIG. 1. Alternatively, it is conceivable that in the open state a lining which lines the interior of the motor vehicle 1 is accessible from above. The interior can be the passenger compartment of the motor vehicle 1.

Figure 4:
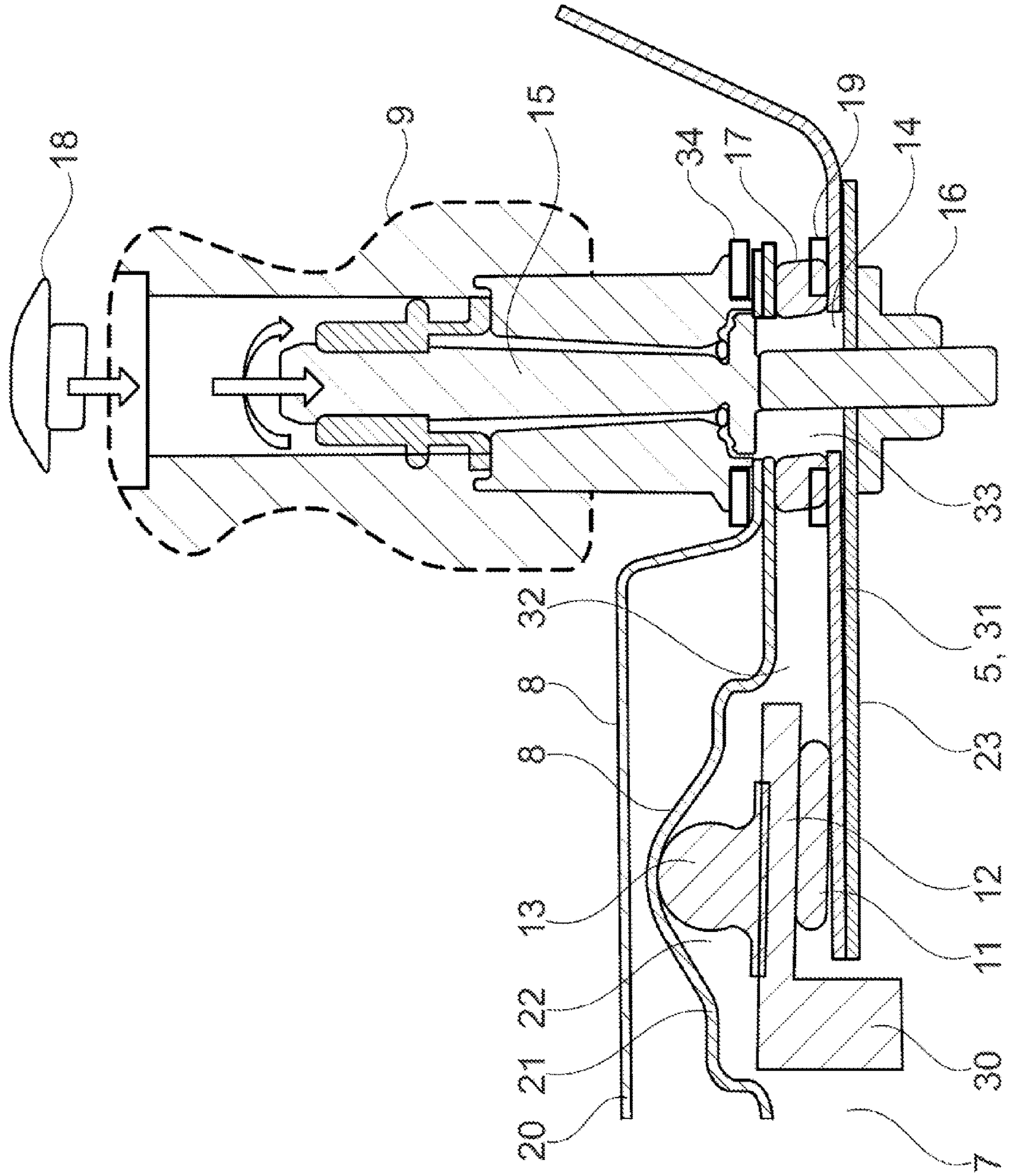
FIG. 4 shows the section A-A of FIG. 3.
Figure 5:
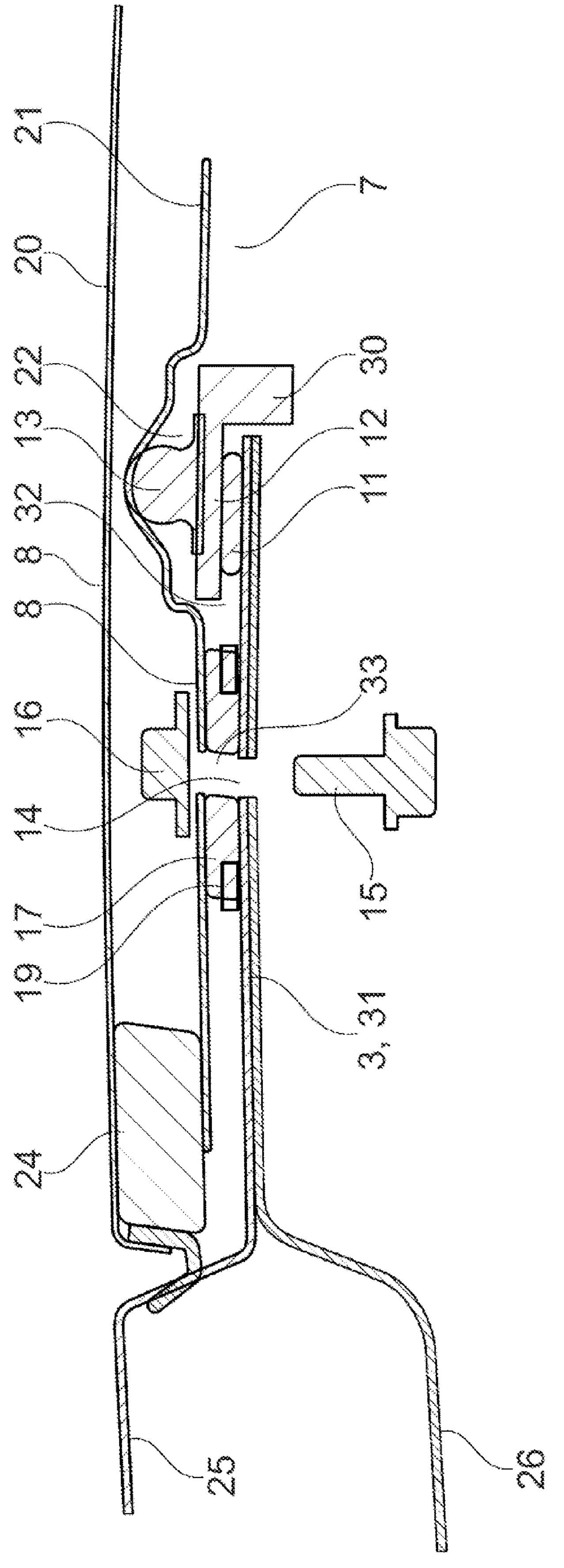
FIG. 5 shows the section B-B of FIG. 3.

FIGS. 4 and 5 show that the roof seal 13 can extend upwardly from the reinforcing profile 12 and terminates at the top at the highest point. It is conceivable that the roof seal 13 is fastened to the reinforcing profile 12 and, in particular, is adhesively bonded to the reinforcing profile 12. In at least one embodiment, the roof seal is adhesively bonded only to the reinforcing profile around the entire periphery of the roof opening with little or no adhesive contacting the roof to facilitate removal of the roof without damaging the roof seal. The body 2 has a wet area 32 which is laterally defined in the closed state by the roof seal 13 and arranged above those regions of the roof frame 31 which are arranged immediately adjacent to the roof seal 13 and on the side of the roof seal 13 facing away from the roof opening 7. In FIG. 4, these are the regions to the right of the roof seal 13 and in FIG. 5 these are the regions to the left of the roof seal 13. The roof frame 31 can be configured to be curved upwardly so that on the side facing away from the roof seal 13 the wet area 32 is defined by the roof frame 31, see FIGS. 4 and 5. Openings (not shown in the figures) which are connected to lines, which are designed to discharge the water downwardly out of the wet area 32, can be incorporated in the roof frame 31 in the region of the wet area 21.

As can be seen in FIGS. 3 to 5 and 7, the body 2 can have a frame seal 11 which is arranged around the entire periphery of the roof opening 7 and seals the region between the frame 31 and the reinforcing profile 12. To this end, the frame seal 11 can be in contact with the roof frame 31 and the reinforcing profile 12. The frame seal 11 can comprise an adhesive or consist of the adhesive, the reinforcing profile 12 being fastened thereby to the roof frame 31.

FIGS. 1 to 7 show that the roof frame 31 can be formed from a first cross beam 3, a second cross beam 4, a first side rail 5 and a second side rail 6. The first cross beam 2 and the second cross beam 4 can be configured in each case, for example, as a body panel flange. The body 2 can be, for example, a skeleton body (see FIGS. 1 and 2) and the beams 3 to 6 can be, in particular, parts of the skeleton of the skeleton body.

The body 2 can have a plurality of threaded fasteners 15 (see FIGS. 4 and 5), the roof 8 being releasably fastened thereby to the roof frame 31 in the closed state, wherein for each of the threaded fasteners 15 in each case a through-hole 14 (see FIGS. 3 to 5) is provided in the roof frame 31, in each case one of the threaded fasteners 15 extending through said through-hole in the closed state. The body 2 can have a first rail 9, wherein in the closed state the first rail 9 is arranged above the roof 8, wherein a first set of threaded fasteners 15 is countersunk in the first rail 9 and pushes the first rail 9 downwardly. The through-holes 14 associated with the first set of threaded fasteners 15 can be arranged, for example, in the first side rail 5, see FIGS. 1, 3 and 4. FIG. 4 shows that in each case the body 2 can have a threaded part 16 for each of the threaded fasteners 15 of the first set, said threaded part being arranged below the roof frame 31 and having an internal thread in which one of the threaded fasteners 15 of the first set engages in the closed state.

The body 2 can have a second rail 10, wherein in the closed state the second rail 10 is arranged above the roof 8, wherein a second set of threaded fasteners 15 is countersunk in the second rail 10 and pushes the second rail 10 downwardly. The through-holes 14 associated with the second set of threaded fasteners 15 can be arranged, for example, in the second side rail 6, see FIGS. 1 and 3. In each case, the body 2 can have a threaded part 16 for each of the threaded fasteners 15 of the second set, said threaded part being arranged below the roof frame 31 and having an internal thread in which one of the threaded fasteners 15 of the second set engages in the closed state. The threaded fasteners 15 can be introduced from above into the threaded parts 16 for the first set and/or the second set of threaded fasteners 15, for fastening the roof 8 into the threaded parts 16. This is illustrated in FIG. 2 by the arrows facing from top to bottom. It is conceivable that the first rail 9 and/or the second rail 10 is arranged in the wet area 32, see FIG. 4. The first rail 9 and/or the second rail 10 can be closed from above by a sealing plug 18, see FIG. 4. The threaded parts 16 for the first set of threaded fasteners 15 and/or for the second set of threaded fasteners 15 can be indirectly fastened to the roof frame 31, in which the threaded parts 16 are fastened to a reinforcing plate 23 which is fastened below the roof frame 31 and which is fastened to the roof frame 31. Alternatively, it is conceivable that the threaded parts 16 for the first set of threaded fasteners 15 and/or the second set of threaded fasteners 15 are fastened directly to the roof frame 31. It is conceivable that a rail seal 34 which seals the region between the first rail 9 and the roof 8 and which, in particular, is in contact with the first rail 9 and the roof 8 is provided for the first rail 9. It is also conceivable that a rail seal 34 which seals the region between the second rail 10 and the roof 8 and which, in particular, is in contact with the second rail 10 and the roof 8 is provided for the second rail 10.

FIG. 5 shows that it is possible to provide a third set of threaded fasteners 15, wherein in each case a threaded part 16, which is fastened to the roof 8, is provided for each threaded fastener 15 of the third set. The threaded fasteners 15 can be introduced from below into the threaded parts 16 for the third set of threaded fasteners 15, for fastening the roof 8 into the threaded parts 16. This is illustrated in FIG. 2 by the arrows facing from bottom to top. The through-holes 14 associated with the third set of threaded fasteners 15 can be arranged, for example, in the first cross beam 3 and the second cross beam 4, see FIGS. 1, 3 and 5.

It is conceivable that in each case a spacer 17 is provided for each of the threaded fasteners 15, said spacer having a spacer through-hole 33 through which the threaded fastener 15 extends in the closed state, said spacer being arranged above the roof frame 31 and being supported by the roof frame 31, and the roof 8 bearing thereagainst from above, see FIGS. 4 and 5. The spacer 17 thus holds the roof 8 and the roof frame 31 spaced apart from one another in the wet area 32. It is conceivable that in each case a sealing ring 19 which seals the region between the roof frame 31 and the spacer 17 and, in particular, is in contact with the roof frame 31 and the spacer 17 is provided for each of the spacers 17 of the first set, the second set and/or the third set.

FIGS. 4 and 5 show that the roof 8 can have an upper roof plate 20 and a lower roof plate 21 which together define a cavity. The threaded parts 16 can be arranged in the cavity, see FIG. 5. It is conceivable that the roof 8 has a spacer strip 24 which holds the upper roof plate 20 and the lower roof plate 21 spaced apart from one another. It is also conceivable that a plurality of spacer strips 24 are provided, see FIG. 7. In particular, the spacer strip 24 can be arranged at the front end of the cavity relative to the direction of travel of the motor vehicle 1. In the case where a plurality of spacer strips 24 are provided, another of the spacer strips 24 can be arranged at the rear end of the cavity relative to the direction of travel of the motor vehicle 1.

The roof 8 can have on its lower face an indentation 22 in which the roof seal 13 is arranged in the closed state, see FIGS. 4 and 5. In particular, the indentation 22 can be configured over the entire periphery. It is also conceivable that the indentation 22 is incorporated in the lower roof plate 21.

FIG. 5 shows that the body 2 forms an upper plate 25, which forms the first cross beam 3, and can have a lower plate 26 which is arranged below the upper plate 25 and defines a cavity together with the upper plate 25.

Figure 6:
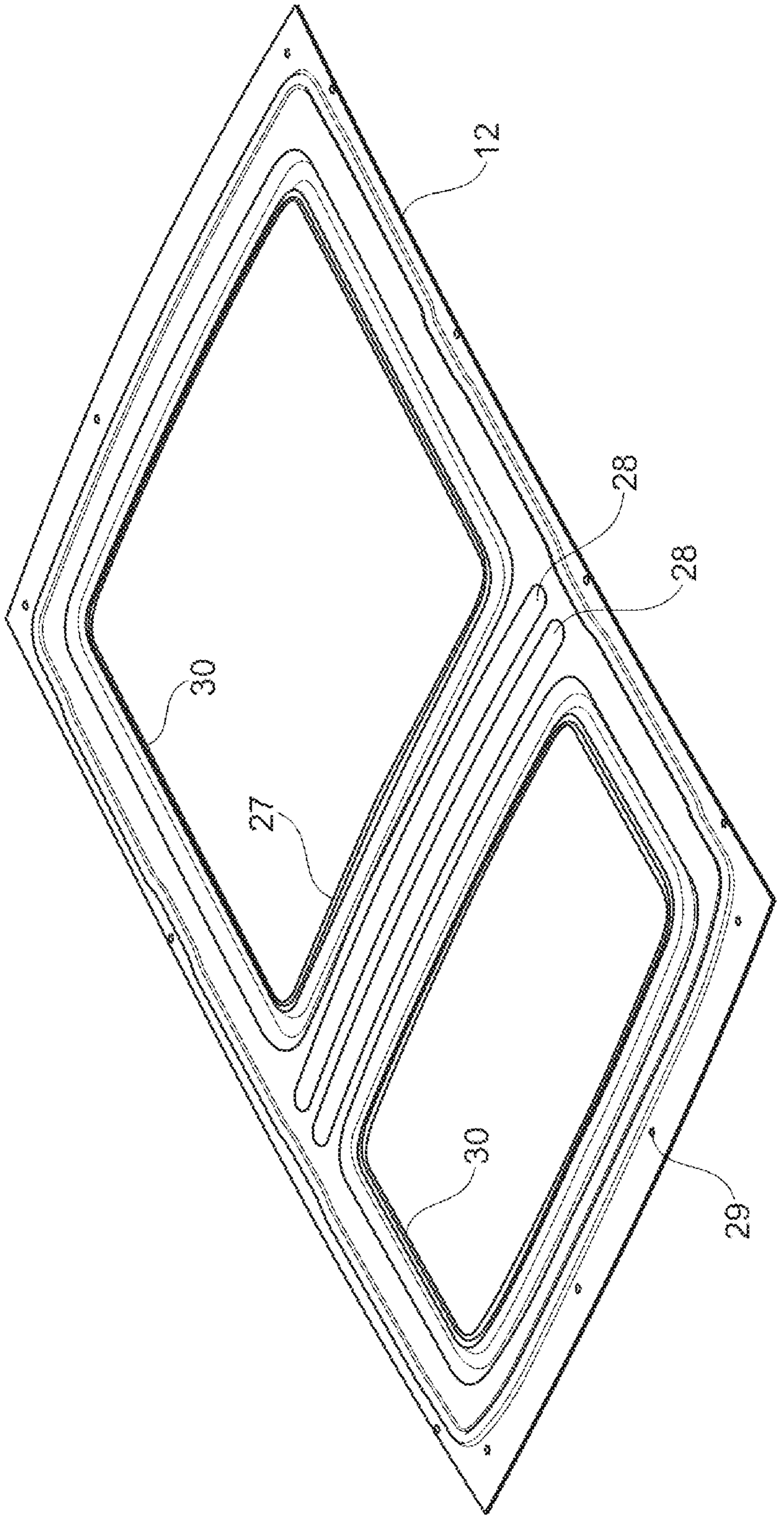
FIG. 6 shows a perspective view of a reinforcing profile of the body.
Figure 7:
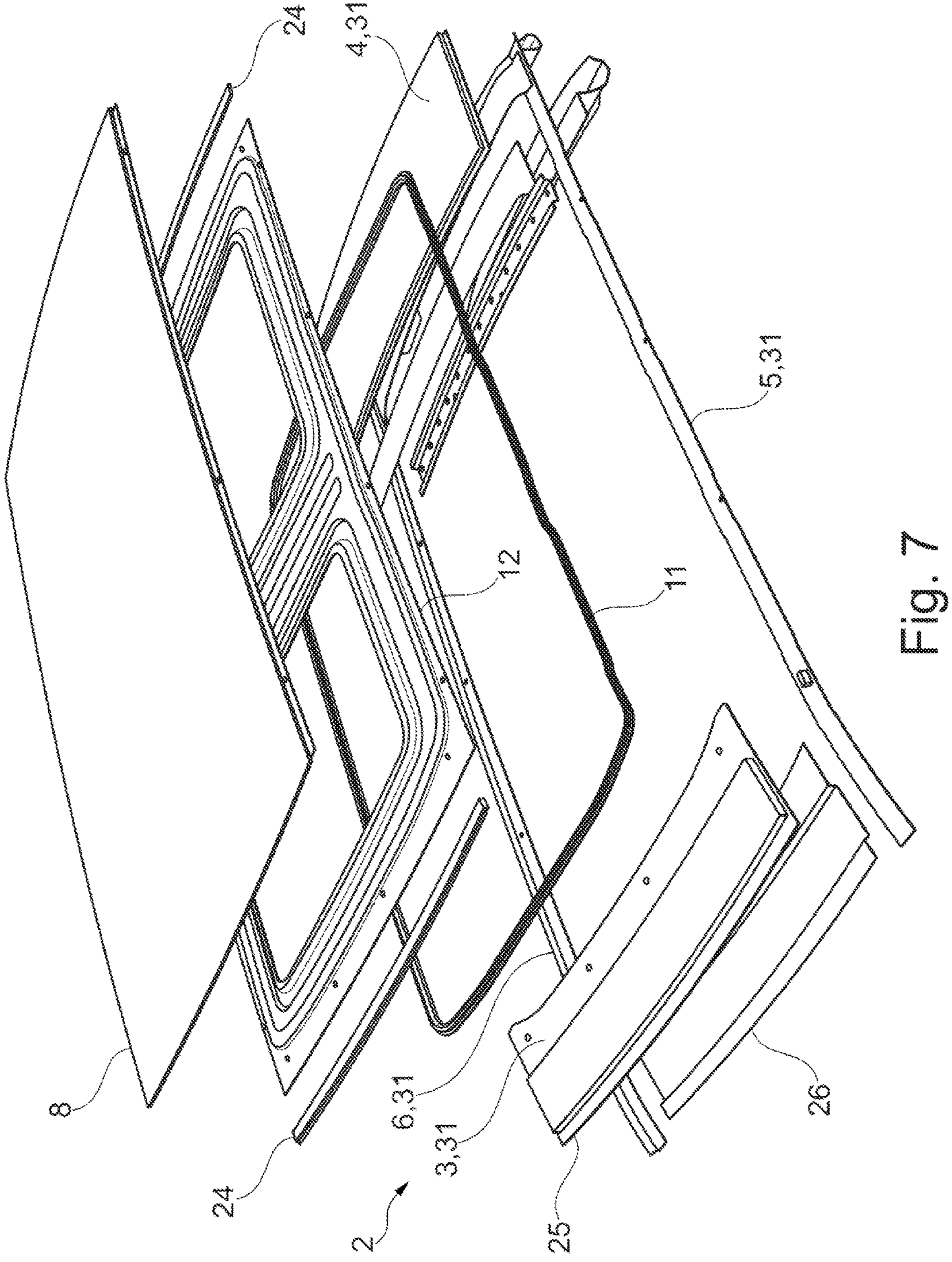
FIG. 7 shows an exploded view of the body with a representative roof.

FIG. 6 shows a reinforcing profile 12. In each case, the reinforcing profile 12 can have for each of the threaded fasteners 15 a through-hole 29 through which in the closed state one of the threaded fasteners 15 extends. The reinforcing profile 12 can have a recessed flange portion 30 which in the closed state protrudes downwardly from the remaining reinforcing profile 12, see FIGS. 4 and 5. The recessed flange portion 30 results in a reinforcement of the reinforcing profile 12. The recessed flange portion 30 can also be arranged internally relative to the roof frame 31, see FIGS. 4 and 5. FIG. 6 shows that it is also conceivable that the reinforcing profile 12 has a web 27 which connects together the sides of the reinforcing profile 12 which are arranged facing away from one another. As a result, the reinforcing profile 12 can be even further reinforced. The web 27 can have one or more web recesses 28, the reinforcing profile 12 being able to be even further reinforced thereby.

The roof seal 13 can be designed to be deformed when the roof 8 is fastened to the roof frame 31. To this end, the roof seal 13 can be, for example, a cavity seal or comprise a foam.

The roof 8 can be, for example, a roof without parts which are movable relative to one another, a sliding roof, a panoramic roof, a tilting roof, a spoiler roof or a retractable roof.

The motor vehicle 1 comprises the body 2.

The terms “top”, “bottom”, “above”, “below”, “higher”, “highest”, “lateral” and similar terms refer to the body which is arranged in the motor vehicle 1 which normally travels forward on a road.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle comprising:

a body defining a roof opening and having a roof frame arranged around the roof opening;

a reinforcing sheet having a reinforcing profile arranged around a periphery of the roof opening fixedly attached to and supported by the roof frame;

a roof seal supported by the reinforcing profile and including a highest point higher than regions of the roof frame that are arranged immediately adjacent to the roof seal; and a roof;

wherein the body has a closed state in which the roof is releasably fastened to the roof frame and is in contact with the roof seal over the periphery from above closing the roof opening, and an open state in which the roof is unfastened from the roof frame and displaced upwardly and away from the roof seal relative to the closed state.

2. The motor vehicle of claim 1, wherein the roof seal is adhesively bonded to the reinforcing profile.

3. The motor vehicle of claim 2, further comprising a frame seal arranged around the periphery of the roof opening sealing a region between the roof frame and the reinforcing profile.

4. The motor vehicle of claim 3, wherein the frame seal comprises an adhesive, the reinforcing profile being fastened to the roof frame by the adhesive of the frame seal.

5. The motor vehicle of claim 1, wherein the body has a plurality of threaded fasteners, the roof being releasably fastened by the threaded fasteners to the roof frame in the closed state, wherein the roof frame includes a through-hole for each of the threaded fasteners.

6. The motor vehicle of claim 5, further comprising a first rail, wherein the first rail is arranged above the roof in the closed state, wherein a first set of threaded fasteners is countersunk in the first rail and releasably secures the first rail and the roof to the body.

7. The motor vehicle of claim 6, wherein the body includes a threaded receiver for each of the threaded fasteners of the first set, each threaded receiver arranged below the roof frame and having an internal thread engaging a corresponding one of the threaded fasteners of the first set in the closed state.

8. The motor vehicle of claim 6, further comprising a second rail, wherein the second rail is arranged above the roof in the closed state, wherein each of a second set of threaded fasteners is countersunk in the second rail and releasably secures the second rail and the roof to the body.

9. The motor vehicle of claim 8, wherein the body includes a threaded receiver for each of the threaded fasteners of the second set, each threaded receiver arranged below the roof frame and having an internal thread engaging a corresponding one of the threaded fasteners of the second set in the closed state.

10. The motor vehicle of claim 9, wherein each of a third set of threaded fasteners extends through a corresponding through-hole of the roof frame and engages a corresponding threaded receiver fixedly secured to the roof.

11. The motor vehicle of claim 10, wherein the roof seal comprises a foam seal deformed when the roof is secured to the roof frame.

12. The motor vehicle of claim 8, wherein the roof includes an indentation on its underside and wherein the roof seal is arranged in the indentation when the body is in the closed state.

13. A motor vehicle comprising:

a body defining a roof opening and having a roof frame arranged around the roof opening;

a reinforcing sheet having a reinforcing profile arranged around a periphery of the roof opening fixedly attached to and supported by the roof frame;

a frame seal positioned between the reinforcing profile and the roof frame;

a roof seal supported by the reinforcing profile and including a highest point higher than regions of the roof frame that are arranged immediately adjacent to the roof seal;

a roof; and a first rail and a second rail, the first and second rails positioned above the roof along associated first and second sides of the roof;

wherein the roof is configured for contact with the roof seal over the periphery from above and for releasable fastening to the roof frame by a first plurality of threaded fasteners extending through the first and second rails, the roof, and the roof frame and engaging corresponding ones of a first plurality of threaded receivers below the roof frame.

14. The motor vehicle of claim 13 wherein the roof seal is adhesively bonded to the reinforcing profile.

15. The motor vehicle of claim 14 wherein the roof seal is adhesively bonded only to the reinforcing profile around the periphery of the roof opening with little or no adhesive contacting the roof facilitating removal of the roof without damage to the roof seal.

16. The motor vehicle of claim 14 wherein each of the first plurality of threaded receivers is permanently affixed to a reinforcing plate, the reinforcing plate arranged beneath the roof frame.

17. The motor vehicle of claim 14 wherein the roof includes a second plurality of threaded receivers fixed to an underside of the roof and configured to engage a corresponding second plurality of threaded fasteners to releasably fasten the roof to the roof frame.

18. The motor vehicle of claim 14 wherein the first plurality of threaded fasteners are countersunk in the first and second rails.

* * * * *